United States Patent
Biehl et al.

(10) Patent No.: US 11,196,736 B2
(45) Date of Patent: Dec. 7, 2021

(54) SYSTEMS AND METHODS FOR LOCATION-AWARE TWO-FACTOR AUTHENTICATION

(71) Applicant: FUJIFILM Business Innovation Corp., Tokyo (JP)

(72) Inventors: Jacob Biehl, San Jose, CA (US); Andreas Donelle Girgensohn, Palo Alto, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 365 days.

(21) Appl. No.: 16/274,171

(22) Filed: Feb. 12, 2019

(65) Prior Publication Data
US 2020/0259823 A1 Aug. 13, 2020

(51) Int. Cl.
*H04L 29/06* (2006.01)
*G06F 21/35* (2013.01)
*H04L 9/32* (2006.01)

(52) U.S. Cl.
CPC .......... *H04L 63/0853* (2013.01); *G06F 21/35* (2013.01); *H04L 9/3247* (2013.01); *H04L 63/0428* (2013.01); *H04L 63/083* (2013.01); *H04L 63/102* (2013.01); *G06F 2221/2111* (2013.01); *H04L 2463/082* (2013.01)

(58) Field of Classification Search
CPC .............. H04L 63/0853; H04L 63/083; H04L 63/0428; H04L 63/102; H04L 9/3247; H04L 2463/082; G06F 21/35; G06F 2221/2111
See application file for complete search history.

(56) References Cited

U.S. PATENT DOCUMENTS

| | | | |
|---|---|---|---|
| 7,257,374 B1* | 8/2007 | Creigh ................. | H04B 17/318 455/41.2 |
| 9,032,498 B1* | 5/2015 | Ben Ayed .............. | G06F 21/35 726/9 |
| 9,491,588 B1 | 11/2016 | Biehl et al. | |
| 2008/0188187 A1* | 8/2008 | Armstrong ............ | G06F 1/3287 455/73 |
| 2014/0051439 A1* | 2/2014 | Brownworth ....... | H04W 60/005 455/435.1 |

(Continued)

OTHER PUBLICATIONS

Wikipedia.org, Cryptographic Nonce, [online] [retrieved on Dec. 10, 2019] 3 pgs., URL: https://en.wikipedia.org/wiki/Cryptographic_nonce.

*Primary Examiner* — Michael R Vaughan
(74) *Attorney, Agent, or Firm* — Procopio, Cory, Hargreaves & Savitch LLP (57) ABSTRACT

A system and method that extend the protections provided by the existing state-of-the-art to provide location-aware two-factor authentication for authenticating users of computer systems. There are many potential use cases where location-aware two-factor authentication could be of value. For instance, for purposes of access to critical business documentation, such as intellectual property, financial data, sales data for publicly traded companies, and personal medical information are all heavily protected information artifacts in most organizations. Providing controls to insure this information is only accessed in secure, trusted locations could greatly reduce the potential of inappropriate information access.

20 Claims, 3 Drawing Sheets

(56) References Cited

U.S. PATENT DOCUMENTS

| | | | | |
|---|---|---|---|---|
| 2014/0273963 A1* | 9/2014 | Su | ............................ | G06F 21/32 |
| | | | | 455/411 |
| 2015/0296371 A1* | 10/2015 | Kong | ...................... | G06F 21/35 |
| | | | | 455/419 |
| 2015/0347738 A1* | 12/2015 | Ulrich | .................... | G06F 21/35 |
| | | | | 726/17 |
| 2015/0351038 A1* | 12/2015 | Dooley | ............. | H04W 52/0229 |
| | | | | 455/41.2 |
| 2017/0337364 A1* | 11/2017 | Whaley | ............... | H04L 63/1408 |
| 2017/0364713 A1* | 12/2017 | Speak | ...................... | G06F 21/70 |
| 2017/0372055 A1* | 12/2017 | Robinson | ................ | G06F 21/35 |
| 2018/0367988 A1* | 12/2018 | Kumar | ................. | H04W 4/029 |
| 2020/0204566 A1* | 6/2020 | Zhong | ................ | H04L 63/0876 |

\* cited by examiner

SYSTEMS AND METHODS FOR LOCATION-AWARE TWO-FACTOR AUTHENTICATION

BACKGROUND OF THE INVENTION

Technical Field

The disclosed embodiments relate in general to computer security systems and methods and, more specifically, to systems and methods for location-aware two-factor authentication.

Description of the Related Art

A large number of business applications are web-based—ranging from consumer banking to enterprise sales, information and interaction is performed in a web browser. Increasingly, especially in the case of consumer applications, these applications are accessible over the open Internet. This universal accessibility lowers deployment and operation costs but greatly increases security concerns. Traditional username/password solutions have proven to be susceptible to guessing and brute force attacks.

A common strategy to improve security is to introduce a two-factor mechanism. For instance, a short numeric code can be sent to the user in an email or text message. These codes are time-sensitive (expire shortly after being created) and thus must be generated at logon time. On the other hand, this process breaks the interaction and can cause unnecessary delay (user has to wait for code to be delivered in email or SMS). An alternative, less disruptive solution is the use of a hardware token. With these devices, a short numeric code is generated on the device that the user then enters into the web login form at or after providing his or her password. While particular implementations differ, the common mechanism of these keys is to use a seed key stored on the device to sign and hash a message, usually consisting of the current timestamp. Segments of that message are then encoded into the number code shown on the device. Once the code is transmitted to the webserver, the code is provided to a trusted security service that has access to the seed key for the security token. It performs the same computation as the token device and if the numeric codes match, a second level of authentication is complete.

More modern approaches use public/private key cryptography. For instance, YubiKeys system, well known in the art, allows users to store certificates on the device. These certificates can then be used to sign a message, often the timestamp, user information, and random data. These devices are inserted into a USB port of a laptop or desktop computer, and when a button is pressed, the message is sent as keystroke data. In this way, the cryptographic strength can be greatly increased over token devices.

However, despite the above advances in secure authentication technology, new and improved systems and methods for two-factor authentication are desirable that would create enhanced user experience.

SUMMARY OF THE INVENTION

The embodiments described herein are directed to systems and methods that substantially obviate one or more of the above and other problems associated with the conventional user authentication systems.

In accordance with one aspect of the embodiments described herein, there is provided a computer-implemented method, the method being performed in a system comprising an location and identification proving device and a client device, the location and identification proving device incorporating a localization signal receiver and the client device comprising a central processing unit and a memory, the computer-implemented method involving: receiving at least one localization signal using the localization signal receiver; measuring a strength of the received localization signal; using the central processing unit to extract an identifier from the received localization signal; determining a location of the location and identification proving device based at least on the measured strength of the received localization signal and the extracted identifier; and allowing or denying authentication of a user based, at least in part, on the determined location.

In one or more embodiments, the method further involves transmitting a request comprising the measured strength of the received localization signal and the extracted identifier to a web service.

In one or more embodiments, the request is encoded.

In one or more embodiments, the request is encrypted.

In one or more embodiments, the request further comprises credentials of the user.

In one or more embodiments, the request further comprises a randomly generated nonce.

In one or more embodiments, the request is digitally signed with a private key stored in the location and identification proving device.

In one or more embodiments, the request is transmitted using a web interface of the web service.

In one or more embodiments, the location and identification proving device is configured to emulate keyboard strokes on the client device and cause at least a portion of the request to be typed into the web interface of the web service.

In one or more embodiments, the web service transmits the request to a trusted service.

In one or more embodiments, the trusted service decrypts the request using a public key corresponding to a private key stored in the location and identification proving device.

In one or more embodiments, the location comprises a location identifier.

In one or more embodiments, the method further involves, if the authentication has been allowed, providing to the user access to a restricted resource.

In one or more embodiments, the location is determined by transmitting the request from the sending a request to a trusted server.

In one or more embodiments, the location and identification proving device is connected to the client device using a USB interface.

In one or more embodiments, the location and identification proving device is connected to the client device using a wireless interface.

In one or more embodiments, at least one localization signal is provided by at least one beacon.

In one or more embodiments, at least one beacon is a Bluetooth Low Energy (BLE) beacon.

In accordance with another aspect of the embodiments described herein, there is provided a non-transitory computer-readable medium embodying a set of computer-executable instructions, which, when executed in connection with a system incorporating an location and identification proving device and a client device, the location and identification proving device comprising a localization signal receiver and the client device comprising a central processing unit and a memory, cause the system to perform a method involving: receiving at least one localization signal using the localization signal receiver; measuring a strength of the received localization signal; using the central processing unit to extract an identifier from the received localization signal; determining a location of the location and identification proving device based at least on the measured strength of the received localization signal and the extracted identifier; and allowing or denying authentication of a user based, at least in part, on the determined location.

In accordance with another aspect of the embodiments described herein, there is provided a system incorporating a location and identification proving device and a client device, the location and identification proving device comprising a localization signal receiver and the client device comprising a central processing unit and a memory, the memory storing a set of computer-readable instructions causing the system to perform a method involving: receiving at least one localization signal using the localization signal receiver; measuring a strength of the received localization signal; using the central processing unit to extract an identifier from the received localization signal; determining a location of the location and identification proving device based at least on the measured strength of the received localization signal and the extracted identifier; and allowing or denying authentication of a user based, at least in part, on the determined location.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

There are many mechanisms for restricting access of web-applications based on location. Geographic location, using reverse IP address lookup or through support of the host operating system (which could utilize GPS, cellular, or other proprietary sensor/data-fusion techniques) could be employed. These techniques, however, can be easily circumvented. For instance, an OS location can be overridden and IP address assignments could be falsified.

Data can also be restricted by network; for instance, only allowing access to a web application if the device is attached to a specific (internal) network. While there are mechanisms to circumvent (e.g. VPN passthroughs), the method is fairly secure. However, it cannot easily scale to restricting access on fine-grain location. In the described embodiments, the deployment could be configured in a way to restrict access on a room or zone level. For instance, a hospital could restrict access to patient data only in patient exam areas, and not in common areas like the cafeteria.

A location-aware two-factor mobile application can also be created and deployed. With this technology, the location of the device that provides the two-factor verification code provides the location verification. This method would be effective, assuming a certain level of trust from an end user. A colluding agent, for instance an assistant located in an approved area could be holding the second factor device and relay to a remote user (in a non-allowed location) the two factor location verification.

In according to one aspect of the embodiments described herein, there is provided a system and method that extend the protections provided by the existing state-of-the-art to provide location-aware two-factor authentication for authenticating users of computer systems. There are many potential use cases where location-aware two-factor authentication could be of value. For instance, for purposes of access to critical business documentation, such as intellectual property, financial data, sales data for publicly traded companies, and personal medical information are all heavily protected information artifacts in most organizations. Providing controls to insure this information is only accessed in secure, trusted locations could greatly reduce the potential of inappropriate information access.

In one or more embodiments, a well-known concept of providing an identity proving device that uses a USB interface is extended to also include hardware and sufficient computing capacity for a location signature to be computed and included in the signed message that is placed in the encrypted message generated by the device. This preserves the affordances of two-factor digital keys, allowing the technology to be used on everyday devices to instantly extend location protection to existing web-based business applications. By using USB On-the-Go (OTG), such a USB dongle could also be used to secure a smartphone. Alternatively, near-field communication (NFC) can be used for communication with a smartphone.

Figure 1:
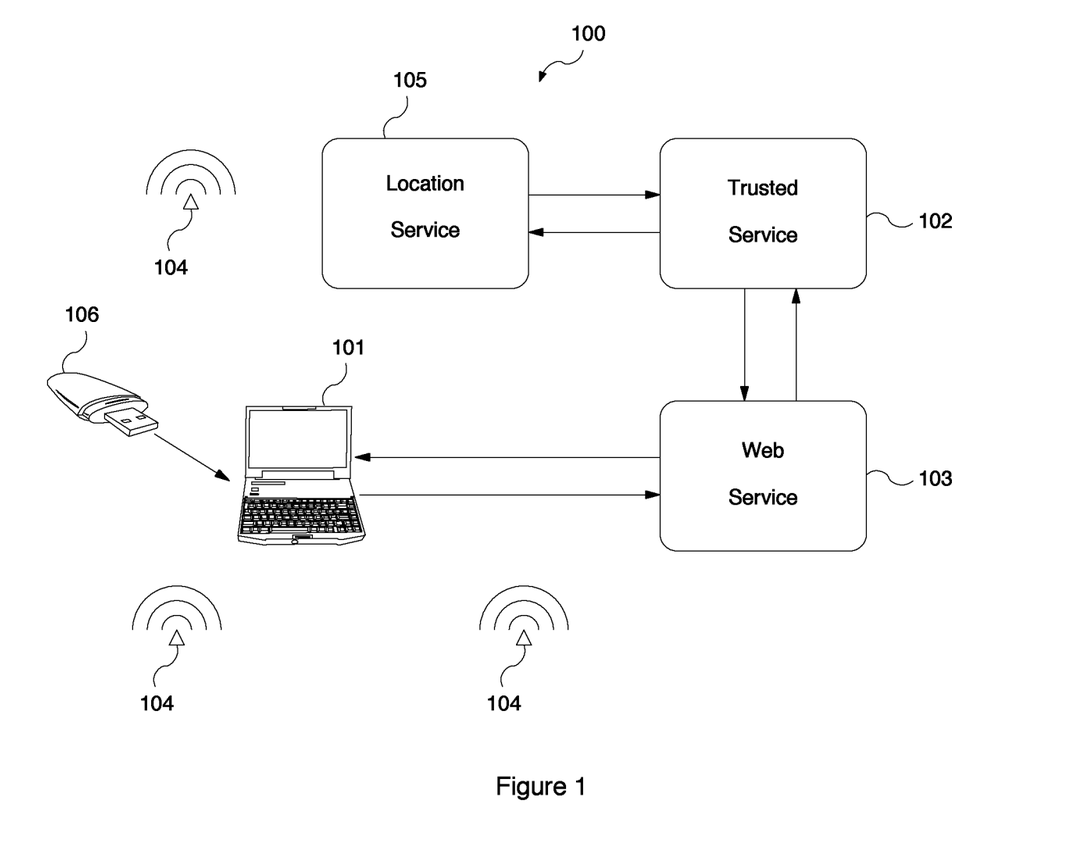
FIG. 1 illustrates an exemplary embodiment of a system 100 for location-aware two-factor authentication.

Some of the basic functions of an embodiment of the system and the major components that enable those functions will now be described in detail. Specifically, FIG. 1 illustrates an exemplary embodiment of a system 100 for location-aware two-factor authentication.

In one or more embodiments, a mobile smartphone, tablet, laptop, desktop computer or any other mobile computing device 101 is used as a client device for user interaction. A identity proving device that uses a USB interface, referred to as the "LocoKey" in this description or an analogous wireless device 106 may incorporate an appropriate Bluetooth Low Energy (BLE) and/or WiFi hardware in order to scan the environment for wireless signals generated by base stations (WiFi) and/or beacons 104 (BLE), which are well known to persons of ordinary skill in the art. The output from the aforesaid WiFi and/or BLE hardware deployed on the LocoKey 106 contains a hardware ID of the corresponding base station and/or beacon 104 and an indication of the signal strength of the received advertisement. In addition, the aforesaid output may include BLE beacon advertisement's random secure "nonce" to prevent replay tampering. This nonce changes every predetermined period of time, such as 1 minute. In other words, in one embodiments, the aforesaid nonce is a time-sensitive cryptographic hash that is transmitted as part of the advertisement payload among the constellation of connected BLE beacons 104, See FIG. 1. This information is serialized, encoded by the LocoKey device 106 into a data structure.

Figure 2:
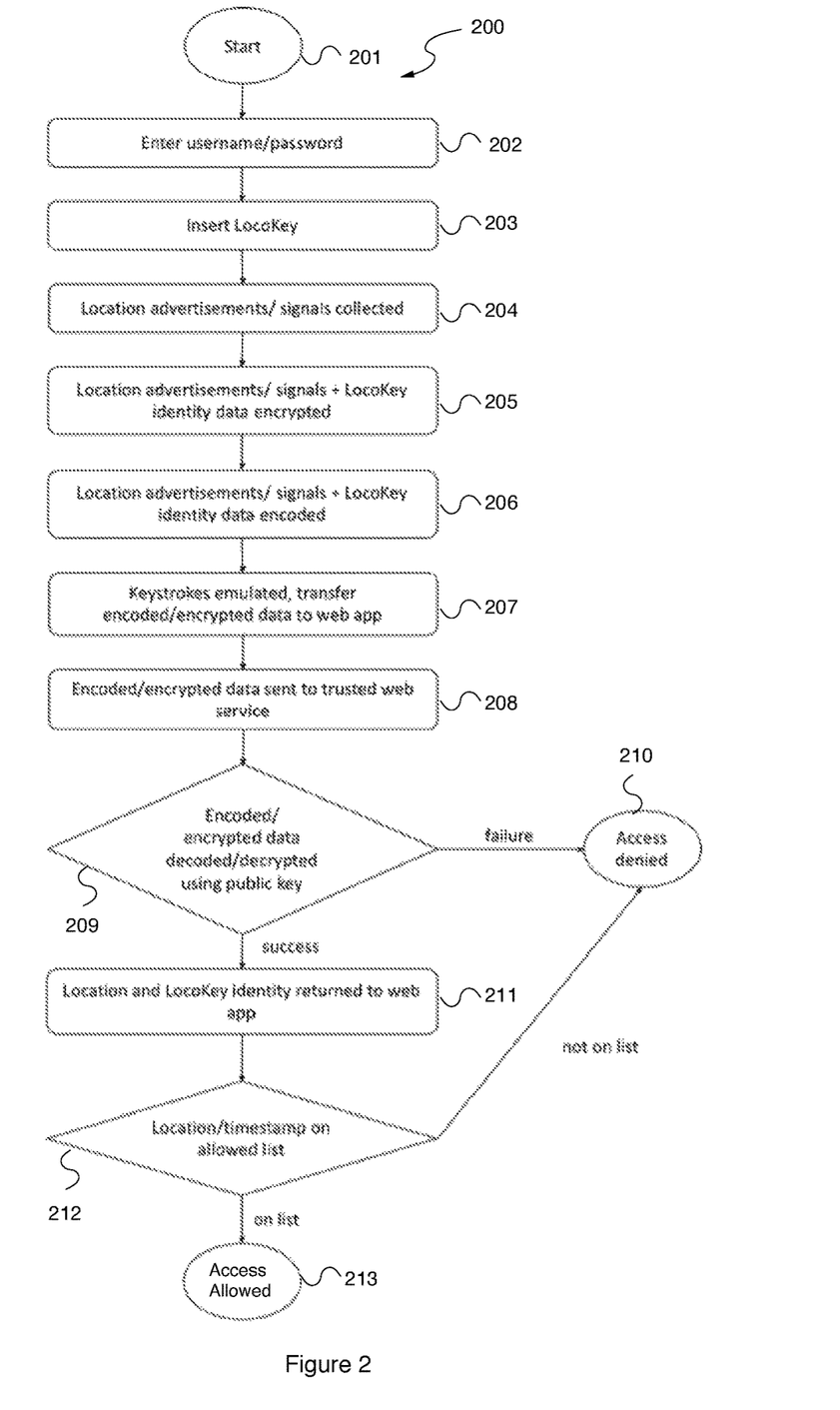
FIG. 2 illustrates an exemplary embodiment of a workflow 200 of the system 100 for location-aware two-factor authentication.

FIG. 2 illustrates an exemplary embodiment of a workflow 200 of the system 100 for location-aware two-factor authentication. In this workflow, the intended goal of the user is to use the enhanced location-aware two-factor authentication to logon to a web application enabled with this service. The operation of the aforesaid workflow starts at step 201. At step 202, the user directly accesses the computing device 101 to navigate to logon URL and enters their username and password. User submits information, for example by clicking a provided login button of the user interface.

At step 203, the user is presented with a new screen that prompts them to insert or connect the LocoKey device or an analogous wireless device 106. It is important to note that in one embodiment, provided scripting enables this web page to listen and capture keystroke data from the computing device 101, as long as the web browser application used by the user to access the web service remains in focus on the host operating system's window manager.

At step 204, once a button is pressed on the LocoKey device 106, embedded software on the LocoKey device 106 uses an embedded Bluetooth Low Energy (BLE) system on a chip (SoC) to listen to current broadcast advertisements being emitted by neighboring BLE beacons 104. After a predetermined amount of time (2 seconds for example), the embedded software on the LocoKey device 106 parses the received advertisement data, assembling a data structure that consists of the beacon ID, the signal strength (averaged) of the received advertisement, and the advertisement's secure "nonce." In various embodiments, instead of BLE, other location technologies such as Wi-Fi round-trip time may be also used. In this case, the SSID and MAC addresses of visible access points would be used instead of the BLE advertisement data.

At step 205, the advertisement data structure as well as unique data identifying the LocoKey device 106 are encrypted using a private key, stored on the LocoKey device 106. In a preferred embodiment, this private key would be stored in a Trusted Platform Module (TPM), well known in the art, not accessible to the software environment on the LocoKey device 106 or the connected computing device (Smartphone, Laptop or Desktop PC) 101. With the TPM, in one embodiment, an API is provided to send data into the module, have it signed, and returned encrypted.

At step 206, the LocoKey device 106 encodes the encrypted data using an encoder compatible with universal keyboard input. For instance, hexadecimal or base64 encoding would be sufficient.

At step 207, the LocoKey device 106 emulates keystrokes on the computing device 101 and emits the encrypted and encoded data. This information is collected by the in-focus web application running on the computing device 101. In one embodiment, the information does not have to be entered into a form field visible to the user. In another embodiment, the system uses a keyboard event handler for the whole page and a data submission in the background to the web service 103.

At step 208, the web application residing on the web service 103 relays the encrypted and encoded data to a trusted web service 102.

At step 209, the relayed data is decoded by the trusted web service 102 and the public key of LocoKey 106 is used to decrypt the identity and advertisement data. In one embodiment, the beacon IDs, along with the advertisement RSSI are used to determine if the location of the LocoKey device 106 is plausible (based on known beacon location) and, if so, to estimate a location (e.g. room or zone within a building or campus). In addition, the time-sensitive "nonce" is compared to the known set of "nonces" and it is verified that the advertisements all came from the same time window. To this end, in one embodiment, the trusted web service 102 may communicate with a location service 105. In another embodiment, the location service 105 may be combined with the trusted web service 102. If the identity and advertisement data cannot be decrypted or the location is not plausible, access is denied, see step 210.

In one or more embodiments, the location service 105 is an Internet accessible web service that, when provided with information about BLE and WiFi signals (such as a hardware ID of the base station or beacon and an indication of the signal strength of the received advertisement) by the trusted web service 102, returns a determination of the location of the LocoKeys device 106, such as a unique location identifier (ID) and, optionally, a human-readable description.

In one or more embodiments, an important functionality provided by the location service 105 is that its location determination of the LocoKey device 106 is trusted. As described in detail in the U.S. patent application Ser. No. 14/732,777, incorporated herein by reference, the advertisements emitted by the BLE beacons 104 in the environment contain nonce (secret keys) that are collected by the LocoKey device 106 and transmitted as part of the scan information first to the trusted web service 102 and then to the aforesaid location service 105. The location service 105 verifies that these nonce (secret keys) are valid and only after that issues the location determination for the LocoKey device 106.

As would be understood by persons of ordinary skill in the art, while the described embodiment is built using the location service 105, its functionality could still be created using a different location framework, so long as the location determination could be authenticated. For example, it could be combined with the trusted web service 102. Therefore, the inventive concepts described herein are not limited to the location service 105.

At step 211, the trusted web service 102 responds back to the web service 103 running the web application with the identity of the LocoKey device 106 and a verified location and time window for the location information collected.

At step 212, the aforesaid web application logic of the web application verifies the association between the username and the identity of the LocoKey device 106. It also verifies the acceptability of the location and time of where the LocoKey device 106 is located for access to the specific web-application data. For example, a white list or a black list may be used. If the identity and location are successfully verified, access is allowed, see step 213. Otherwise, it is denied, see step 210.

Optionally, the web application may send sensitive information back to the computing system 101 encrypted with the public key of the user. The TPM can be used to decrypt that information with the private key before displaying it to the user.

At optional step 213, the LocoKey device 106 can be configured to periodically transmit a new location signature, either over USB or using the BLE network to a trusted gateway beacon. The web client would clear all local data once the device leaves the restricted area.

Exemplary Embodiment of a Computer System

Figure 3:
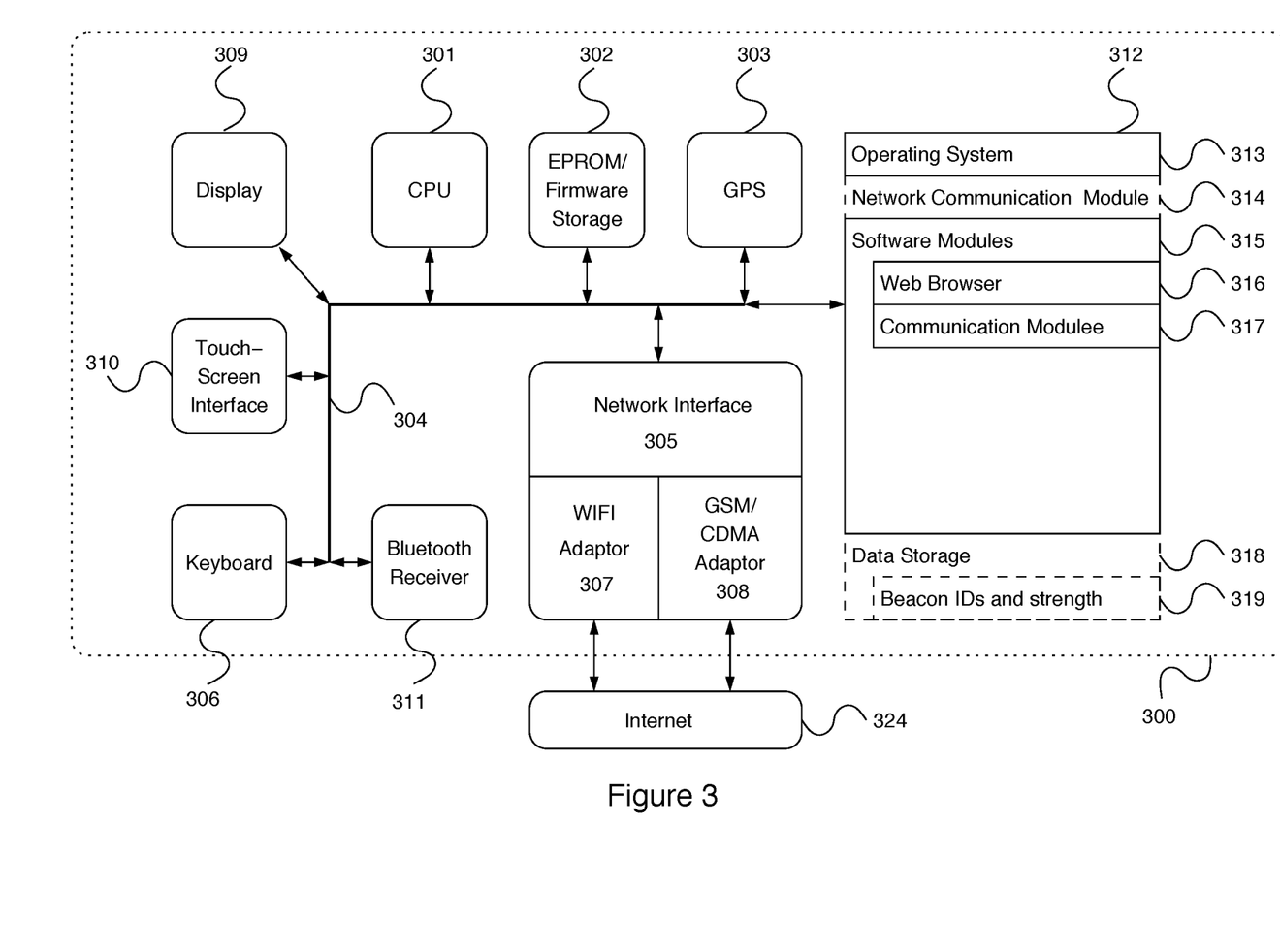
FIG. 3 illustrates an exemplary embodiment of a computer system 300, which may be used, in whole or in part, to implement the techniques described herein and, for example, the computing system 101, computing platforms running web service 103, trusted service 102, location service 105 and/or location and identification proving device 106.

FIG. 3 illustrates an exemplary embodiment of a computer system 300, which may be used, in whole or in part, to implement the techniques described herein and, for example, the computing system 101, computing platforms running web service 103, trusted service 102, location service 105 and/or LocoKey device 106. In one or more embodiments, the computer 300 may be implemented within the form factor of a server, a desktop or a mobile computing device well known to persons of skill in the art. In an alternative embodiment, the computer 300 may be implemented based on a laptop or a notebook computer. Yet in an alternative embodiment, the computer 300 may be a specialized computing system, such as USB device.

The computerized system 300 may include a data bus 304 or other interconnect or communication mechanism for communicating information across and among various hardware components of the mobile computerized system 300, and a central processing unit (CPU or simply processor) 301 coupled with the data bus 304 for processing information and performing other computational and control tasks. Computerized system 300 also includes a memory 312, such as a random access memory (RAM) or other dynamic storage device, coupled to the data bus 304 for storing various information as well as instructions to be executed by the processor 301. The memory 312 may also include persistent storage devices, such as a magnetic disk, optical disk, solid-state flash memory device or other non-volatile solid-state storage devices.

In one or more embodiments, the memory 312 may also be used for storing temporary variables or other intermediate information during execution of instructions by the processor 301. Optionally, computerized system 300 may further include a read only memory (ROM or EPROM) 302 or other static storage device coupled to the data bus 304 for storing static information and instructions for the processor 301, such as firmware necessary for the operation of the computerized system 300, basic input-output system (BIOS), as well as various configuration parameters of the computerized system 300.

In one or more embodiments, the computerized system 300 may incorporate a display device 309, which may be also coupled to the data bus 304, for displaying various information to a user of the computerized system 300. In an alternative embodiment, the display device 309 may be associated with a graphics controller and/or graphics processor (not shown). The display device 309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 309 may be incorporated into the same general enclosure with the remaining components of the computerized system 300. In an alternative embodiment, the display device 309 may be positioned outside of such enclosure.

In one or more embodiments, the computerized system 300 may further incorporate a GPS receiver 303 connected to the data bus 304 and configured to receive location information from one or more GPS satellites and transmit this information to the processor 301 via the data bus 304.

In one or more embodiments, the computerized system 300 may incorporate one or more input devices, such as a touchscreen interface 310 for receiving tactile commands and a keyboard 306, which all may be coupled to the aforesaid data bus 304 for communicating information, including, without limitation, user command selections to the processor 301. In an alternative embodiment, input devices may include a system for tracking eye movements of the user (not shown), which may be used to indicate to the computerized system 300 the command selection by the user.

In one or more embodiments, the computerized system 300 may additionally include a location signal receiver 311, such as a Bluetooth receiver, configured to perform scan for beacons 101 and supply scan data described above to the processor 301 via the data bus 304.

In one or more embodiments, the computerized system 300 may additionally include a communication interface, such as a network interface 305 coupled to the data bus 304. The network interface 305 may be configured to establish a connection between the computerized system 300 and the Internet 324 using at least one of WIFI interface 307 and the cellular network (GSM or CDMA) adaptor 308. The network interface 305 may be configured to provide a two-way data communication between the computerized system 300 and the Internet 324. The WIFI interface 307 may operate in compliance with 802.11a, 802.11b, 802.11g and/or 802.11n protocols as well as Bluetooth protocol well known to persons of ordinary skill in the art. In an exemplary implementation, the WIFI interface 307 and the cellular network (GSM or CDMA) adaptor 308 send and receive electrical or electromagnetic signals that carry digital data streams representing various types of information. For example, the aforesaid networking components may be used to establish a network data connection between the computerized system 300 and other components of the localization system 100, such as the central server 104 and third party services/applications 108.

In one or more embodiments, the Internet 324 typically provides data communication through one or more sub-networks to other network resources. Thus, the computerized system 300 is capable of accessing a variety of network resources located anywhere on the Internet 324, such as web servers, other content servers as well as other network data storage resources. In one or more embodiments, the computerized system 300 is configured send and receive messages, media and other data, including application program code, through a variety of network(s) including Internet 324 by means of the network interface 305. In the Internet example, when the computerized system 300 acts as a network client, it may request code or data for an application program executing on the computerized system 300. Similarly, it may send various data or computer code to other network resources.

In one or more embodiments, the computerized system 300 uses the network interface 305 to send request(s), via the Internet 324, such as HTTP requests, to the central server 104 and receive various information, including, without limitation, the aforesaid location information and the timestamp, therefrom.

In one or more embodiments, the functionality described herein is implemented by computerized system 300 in response to processor 301 executing one or more sequences of one or more instructions contained in the memory 312. Such instructions may be read into the memory 312 from another computer-readable medium. Execution of the sequences of instructions contained in the memory 312 causes the processor 301 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 301 for execution. For example, the instructions may initially be carried on a magnetic disk from a remote computer. Alternatively, a remote computer can load the instructions into its dynamic memory and send the instructions over the Internet 324. Specifically, the computer instructions may be downloaded into the memory 312 of the computerized system 300 from the foresaid remote computer via the Internet 324 using a variety of network data communication protocols well known in the art.

In one or more embodiments, the memory 312 of the computerized system 300 may store any of the following software programs, applications or modules:

1. Operating system (OS) 313, which may be a mobile operating system for implementing basic system services and managing various hardware components of the computerized system 300. Exemplary embodiments of the operating system 313 are well known to persons of skill in the art, and may include any now known or later developed mobile operating systems.

2. Network communication module 314 for enabling network communications using one or more network interfaces described below.

3. Software modules 315 may include, for example, a set of software applications executed by the processor 301 of the computerized system 300, which cause the computerized mobile system 300 to perform certain predetermined functions, such as receive the beacon signals as described above, verify location and/or perform authentication. In one or more embodiments, the software modules 315 may include, for example, the web browser 316 as well as communication module 317.

3. Data storage 318 may be used, for example, for storing the bacon scan data 319.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for location-aware two-factor authentication. It is intended that the specification and examples be considered as exemplary only, with a true scope and spirit of the invention being indicated by the following claims.

What is claimed is:

1. A computer-implemented method, the method being performed in a system comprising an location and identification proving device and a client device, the location and identification proving device comprising a localization signal receiver and the client device comprising a central processing unit and a memory, the computer-implemented method comprising:

by the location and identification proving device:
receiving, from at least one localization signal source, at least one localization signal using the localization signal receiver;
measuring a strength of the received localization signal;
extracting an identifier of the at least one localization signal source from the received localization signal; and
assembling and providing, to the client device, a data structure comprising at least the identifier and the measured strength of the received localization signal;

providing the received data structure to a web service by the client device; and by the web service:
determining a location of the location and identification proving device based at least on the measured strength of the received localization signal and the identifier from the received data structure received from; and
allowing or denying authentication of a user based, at least in part, on the determined location.

2. The computer-implemented method of claim 1, further comprising transmitting a request comprising the measured strength of the received localization signal and the extracted identifier to the web service.

3. The computer-implemented method of claim 2, wherein the request is encoded.

4. The computer-implemented method of claim 2, wherein the request is encrypted.

5. The computer-implemented method of claim 2, wherein the request further comprises credentials of the user.

6. The computer-implemented method of claim 2, wherein the request further comprises a randomly generated nonce.

7. The computer-implemented method of claim 2, wherein the request is digitally signed with a private key stored in the location and identification proving device.

8. The computer-implemented method of claim 2, wherein the request is transmitted using a web interface of the web service.

9. The computer-implemented method of claim 8, wherein the location and identification proving device is configured to emulate keyboard strokes on the client device and cause at least a portion of the request to be typed into the web interface of the web service.

10. The computer-implemented method of claim 2, wherein the web service transmits the request to a trusted service.

11. The computer-implemented method of claim 2, wherein the trusted service decrypts the request using a public key corresponding to a private key stored in the location and identification proving device.

12. The computer-implemented method of claim 2, wherein the location is determined by transmitting the request from the web service to a trusted server.

13. The computer-implemented method of claim 1, wherein the location comprises a location identifier.

14. The computer-implemented method of claim 1, further comprising, if the authentication has been allowed, providing to the user access to a restricted resource.

15. The computer-implemented method of claim 1, wherein the location and identification proving device is connected to the client device using a USB interface.

16. The computer-implemented method of claim 1, wherein the location and identification proving device is connected to the client device using a wireless interface.

17. The computer-implemented method of claim 1, wherein at least one localization signal is provided by at least one beacon.

18. The computer-implemented method of claim 17, wherein the at least one beacon is a Bluetooth Low Energy (BLE) beacon.

19. A non-transitory computer-readable medium embodying a set of computer-executable instructions, which, when executed in connection with a system comprising an location and identification proving device and a client device, the location and identification proving device comprising a localization signal receiver and the client device comprising a central processing unit and a memory, cause the system to perform a method comprising:
by the location and identification proving device:
receiving, from at least one localization signal source, at least one localization signal using the localization signal receiver;
measuring a strength of the received localization signal;
extracting an identifier of the at least one localization signal source from the received localization signal; and
assembling and providing, to the client device, a data structure comprising at least the identifier and the measured strength of the received localization signal;
providing the received data structure to a web service by the client device; and
by the web service:
determining a location of the location and identification proving device based at least on the measured strength of the received localization signal and the identifier from the received data structure received from; and
allowing or denying authentication of a user based, at least in part, on the determined location.

20. A system comprising an location and identification proving device and a client device, the location and identification proving device comprising a localization signal receiver and the client device comprising a central processing unit and a memory, the memory storing a set of computer-readable instructions causing the system to perform a method comprising:
by the location and identification proving device:
receiving, from at least one localization signal source, at least one localization signal using the localization signal receiver;
measuring a strength of the received localization signal;
extracting an identifier of the at least one localization signal source from the received localization signal; and
assembling and providing, to the client device, a data structure comprising at least the identifier and the measured strength of the received localization signal;
providing the received data structure to a web service by the client device; and
by the web service:
determining a location of the location and identification proving device based at least on the measured strength of the received localization signal and the identifier from the received data structure received from; and
allowing or denying authentication of a user based, at least in part, on the determined location.

* * * * *